US 6,600,009 B2

(12) United States Patent
Inoue et al.

(10) Patent No.: US 6,600,009 B2
(45) Date of Patent: Jul. 29, 2003

(54) PROCESS FOR THE PREPARATION OF POLYARYLENE SULFIDE

(75) Inventors: Satoshi Inoue, Funabashi (JP); Osamu Komiyama, Ichihara (JP)

(73) Assignee: Dainippon Ink and Chemicals, Incorporated, Tokyo (JP)

( * ) Notice: Subject to any disclaimer, the term of this patent is extended or adjusted under 35 U.S.C. 154(b) by 0 days.

(21) Appl. No.: 08/957,414

(22) Filed: Oct. 24, 1997

(65) Prior Publication Data

US 2003/0065131 A1 Apr. 3, 2003

(30) Foreign Application Priority Data

Oct. 31, 1996 (JP) .............................. 8-304163
Jan. 9, 1997 (JP) .............................. 9-013343

(51) Int. Cl.$^7$ ............................................. C08G 65/02
(52) U.S. Cl. ...................................................... 528/388
(58) Field of Search ................................. 528/486, 487, 528/490, 388; 525/537

(56) References Cited

U.S. PATENT DOCUMENTS

| | | |
|---|---|---|
| 3,919,177 A | 11/1975 | Campbell |
| 4,016,145 A | 4/1977 | Campbell |
| 4,038,261 A | 7/1977 | Crouch et al. |
| 4,038,263 A | 7/1977 | Edmonds, Jr. et al. |
| 4,645,826 A | 2/1987 | Iizuka et al. ................. 528/388 |
| 4,728,723 A | 3/1988 | Nakamura et al. ........... 528/486 |
| 4,769,426 A | 9/1988 | Iwasaki et al. .............. 525/537 |
| 5,015,702 A | 5/1991 | Scoggins et al. ............ 525/537 |
| 5,235,034 A | 8/1993 | Bobsein et al. .............. 528/485 |
| 5,342,920 A | 8/1994 | Imai et al. |
| 5,350,834 A | 9/1994 | Bobsein et al. .............. 528/485 |
| 5,352,768 A * | 10/1994 | Stuber et al. ................ 528/486 |
| 5,789,533 A | 8/1998 | Yamanaka et al. .......... 528/388 |

FOREIGN PATENT DOCUMENTS

| | | |
|---|---|---|
| CA | 2133786 | 4/1995 |
| JP | 45-3368 | 2/1970 |
| JP | 60-8359 | 1/1985 |
| JP | 61-7332 | 1/1986 |
| JP | 62-48728 | 3/1987 |
| JP | 62-223232 | 10/1987 |
| JP | 3-28267 | 3/1991 |
| JP | 3-28268 | 3/1991 |
| JP | 5-222196 | 8/1993 |
| JP | 070320 | 3/1995 |
| JP | 7-70320 | 3/1995 |
| JP | 7-118389 | 5/1995 |

* cited by examiner

*Primary Examiner*—Samuel A. Acquah
(74) *Attorney, Agent, or Firm*—Pitney, Hardin, Kipp & Szuch LLP

(57) ABSTRACT

In the preparation of polyarylene sulfide (PAS) by reacting an alkali metal sulfide with a dihaloaromatic compound in an organic amide solvent to obtain a polyarylene sulfide slurry and subjecting the slurry to acid treatment, an acid or hydrogen salt is added to the slurry in such an amount that a pH of the slurry is more than 7.0 and at most 11.0 to carry out the acid treatment. Alternatively, a zinc compound in an amount of 0.1 to 1.5 mole % per mole of the alkali metal sulfide supplied is added to the polyarylene sulfide slurry to treat the slurry, and, then, an acid or hydrogen salt in an amount of at least 0.2 mole % per mole of the alkali metal sulfide supplied is added.

The PAS thus obtained has high crystallization speed, high whiteness, high mechanical strength and high melt viscosity, $V_6$.

18 Claims, No Drawings

PROCESS FOR THE PREPARATION OF POLYARYLENE SULFIDE

FIELD OF THE INVENTION

The present invention relates to a process for the preparation of polyarylene sulfide.

BACKGROUND OF THE INVENTION

Polyarylene sulfide (hereinafter referred to as PAS), typically polyphenylene sulfide (hereinafter referred to as PPS), has been widely used as a material for electric and electronic parts, automobile parts and chemical apparatus parts because it is excellent in heat resistance, processability, chemical resistance, flame resistance and dimensional stability. Particularly, so-called linear PAS, which is made to have high molecular weight by polymerization has such characteristics as less impurity content, good hue and excellent heat stability. It has, therefore, high value for use.

Some processes for the preparation of the aforesaid linear PAS are known, such as a process in which an alkali metal carboxylate is used as a polymerization aid in a polymerization reaction (Japanese Patent Publication No. Sho-52-12240/1977), a process in which the polymerization reaction is carried out in two steps and a large amount of water is positively added in the second step reaction (Japanese Patent Application Laid-Open No. Sho-61-7332/1986), or a process in which a part of a gaseous phase in a reactor is condensed by cooling a gaseous phase part of the reactor to return the condensed liquid to a liquid phase during the polymerization reaction (Japanese Patent Application Laid-Open No. Hei-5-222196/1993).

However, when the PAS obtained by these processes is used in injection molding, crystallization is sometimes insufficient depending on molding conditions. In order to shorten a molding cycle, it is needed that a crystallization speed of PAS is high, that is, a crystallization temperature, Tc, is high. However, the PAS obtained by the aforesaid processes has a low Tc and, therefore, its molding cycle cannot be shorten.

As a method for raising the crystallization temperature, Tc, Japanese Patent Application Laid-Open No. Sho-62-48728/1987, for instance, discloses a process where a formed PAS polymer is separated from a polymerization reaction mixture after the polymerization and treated in a strong acid solution of a pH less than 2. In Japanese Patent Application Laid-Open No. Hei-7-118389/1995, there is disclosed a process for the acid treatment of PAS in an organic solvent/water mixture containing an organic acid in a concentration of 0.1–5.0 % by weight with a weight ratio of the organic solvent : water being in a range of 4:1 to 1:10. However, in both of these methods, PAS is treated in an acid solution of a low pH and, therefore, these methods have a disadvantage that the filterability (filtration rate) of the reaction slurry is poor and, accordingly, the productivity is low. Moreover, it has been found that in the process of Sho-62-48728/1987, a melt viscosity of the PAS obtained is lowered remarkably by the acid treatment. In the process of Hei-7-118389/1995, a cost for recovery of the solvent is high because the filtrate after the water washing contains water and by-product salts as well as the solvent.

In Japanese Patent Publication No. Hei-6-68025/1994, there is disclosed a process in which an inorganic or organic acid is added to a PAS slurry after the completion of a polymerization and the slurry is stirred at or below pH 6, washed, filtered, washed with water and dried. The aforesaid process relates to a purification process to remove impurities such as alkali metal ions in PAS. In the PAS obtained by this process, the impurity content is not sufficiently low and a crystallization temperature, Tc, is low.

In all of the acid treatment processes mentioned above, PAS is separated by filtering the PAS slurry obtained and then repeatedly washed with water and filtered. Accordingly, almost all of the solvent used in the polymerization is removed from PAS by the washing with water and filtration and thus contained in the filtrate. It is, therefore, necessary to recover the solvent. Because the filtrate is composed of water, the polymerization solvent and by-product salts, the recovery of the solvent is complicated and costly. Meanwhile, if the solvent is not recovered, the cost increases inevitably. This is not economical, either. When PAS is fine powder, filterability is low in the washing with water and filtration and, therefore, it takes long time for filtration. This leads to low productivity.

Meanwhile, PAS is of pale yellow in most cases. Even when PAS of high whiteness is obtained, it is easily colored in melt molding. Accordingly, in order to obtain PAS articles of high whiteness, special means are needed. Various means for decreasing discoloration have been used.

In Japanese Patent Application Laid-Open No. Sho-60-8359/1985, it is proposed that white pigment is mixed to a PPS resin to whiten it while a decrease in mechanical strength due to the addition of the white pigment is compensated by adding an epoxy resin. However, this leads to higher costs. Japanese Patent Application Laid-Open Nos. Hei-3-28267/1991 and Hei-3-28268/1991 discloses a composition which is obtained by adding an organic phosphorus compound to PAS. However, there are disadvantages that a melt viscosity increases and, in addition, gas generates in melt molding.

In Japanese Patent Application Laid-Open No. Hei-7-70320/1995, the present inventors discloses a process for the preparation of PAS by reacting an alkali metal sulfide with a dihaloaromatic compound in a polar aprotic solvent, wherein 0.001–0.1 mole of a zinc compound per mole of the alkali metal sulfide is added to a polymerization system or an aftertreatment system at any point of time from a time when a conversion of the dihaloaromatic compound is 30 % to a step of aftertreatment of a polymerization slurry. This process provides PAS with high whiteness and high melt viscosity.

BRIEF DESCRIPTION OF THE INVENTION

A purpose of the present invention is to provide a process for the preparation of PAS having a high crystallization speed and high whiteness and, in addition, high mechanical strength.

In prior art, acid treatment was carried out in a relatively low pH region to increase a crystallization temperature of PAS, Tc, as mentioned above. The present inventors have now found that when the acid treatment is carried out in a pH range of more than 7.0 and at most 11.0, PAS may be obtained which has a higher Tc and, in addition, higher whiteness and higher mechanical strength compared to the PAS of the prior art. This leads to the present invention.

The present invention first provides (1) a process for the preparation of polyarylene sulfide by reacting an alkali metal sulfide with a dihaloaromatic compound in an organic amide solvent to obtain a polyarylene sulfide slurry and subjecting the slurry to acid treatment, characterized in that an acid or hydrogen salt is added to the slurry in such an amount that a pH of the slurry is more than 7.0 and at most 11.0 to carry out the acid treatment.

In preferred embodiments of the process, the pH of the polyarylene sulfide slurry after the addition of the acid or hydrogen salt is 7.5 to 10.0.

The acid or hydrogen salt is added, preferably in an amount of 0.2 to 10 mole %, more preferably 0.5 to 6.0 mole %, per mole of the alkali metal sulfide supplied.

The polyarylene sulfide slurry after treated with the acid or hydrogen salt is filtered and the solvent-containing filter cake obtained is heated in a non-oxidizing atmosphere to remove the solvent.

The aforesaid heating is carried out, preferably at a temperature of 150 to 250 C., particularly 180 to 230 C.

After the removal of the solvent, the filter cake is dispersed in water to be washed.

The polymerization reaction of an alkali metal sulfide with a dihaloaromatic compound is carried out while cooling a gaseous phase part of a reactor to condense a part of the gaseous phase in the reactor, and returning a condensed liquid to a liquid phase.

The present invention secondly provides (2) a process for the preparation of polyarylene sulfide by reacting an alkali metal sulfide with a dihaloaromatic compound in an organic amide solvent to obtain a polyarylene sulfide slurry, and subjecting the slurry to acid treatment, characterized in that a zinc compound in an amount of 0.1 to 1.5 mole % per mole of an alkali metal sulfide supplied is added to the polyarylene sulfide slurry to treat the slurry and, then, an acid or hydrogen salt in an amount of at least 0.2 mole % per mole of the alkali metal sulfide supplied is added to conduct the acid treatment.

The obtained PAS has a further higher Tc and further whiteness, compared to the PAS obtained in the process (1).

In preferred embodiments of this process, the zinc compound is added in an amount of 0.5 to 1.0 mole % per mole of the alkali metal sulfide supplied.

The acid or hydrogen salt is added, preferably in an amount of 0.2 to 10 mole %, more preferably 0.5 to 6.0 mole %, per mole of the alkali metal sulfide supplied.

The polyarylene sulfide slurry after treated with the acid or hydrogen salt is filtered and the solvent-containing filter cake obtained is heated in a non-oxidizing atmosphere to remove the solvent.

The aforesaid heating is carried out, preferably at a temperature of 150 to 250° C., particularly 180 to 230° C.

After the removal of the solvent, the filter cake is dispersed in water to be washed.

PREFERRED EMBODIMENTS OF THE INVENTION

In the process (1) of the present invention, the amount of the acid or hydrogen salt to be added to the PAS slurry after the reaction is such that a pH of the PAS slurry after addition of the acid or hydrogen salt is more than 7.0 and at most 11.0, preferably 7.5 to 10.0. If the pH is 7.0 or lower, a molecular weight of the PAS obtained lowers and, in addition, it is impossible to improve whiteness of the PAS. Meanwhile, if the pH exceeds 11.0, it is impossible to increase a crystallization temperature, Tc, and whiteness of the PAS is low. Although the amount of the acid or hydrogen salt to be added may be such that a pH of the PAS slurry is more than 7.0 and at most 11.0, it is preferably at most 10 mole %, particularly at most 6.0 mole %, and preferably at least 0.2 %, particularly at least 0.5 mole %, per mole of the alkali metal sulfide supplied, depending on types of the acid or hydrogen salt used or a pH of a PAS slurry after a reaction.

The acid used in the invention may be organic acids and inorganic acids. The organic acids include saturated aliphatic acids such as formic acid, acetic acid, propionic acid, butyric acid, valeric acid, caproic acid and monochloroacetic acid; unsaturated aliphatic acids such as acrylic acid, crotonic acid and oleic acid; aromatic carboxylic acids such as benzoic acid, phthalic acid and salicylic acid; dicarboxylic acids such as oxalic acid, maleic acid and fumaric acid; and sulfonic acids such as methane sulfonic acid and para-toluene sulfonic acid. The inorganic acids include hydrochloric acid, sulfuric acid, sulfurous acid, nitric acid, nitrous acid and phosphoric acid. The hydrogen salts include sodium hydrogen sulfate, disodium hydrogen phosphate and sodium hydrogen carbonate. In commercial plants, the organic acids are preferable, because they less corrode metalic parts.

In the present process, treatment of a PAS slurry with an acid or hydrogen salt is preferably carried out as follows:

The acid or hydrogen salt is added to the PAS slurry produced in a PAS polymerization process. When the acid or hydrogen salt is liquid, it is added as such or after diluted with a solvent, preferably with an organic amide solvent used in PAS polymerization as mentioned below, for example, N-methyl pyrrolidone. When the acid or hydrogen salt is solid, it is added after dissolved in a proper medium such as water or the aforesaid organic amide solvent.

An acid treatment temperature may be any temperature, preferably, in a range of from room temperature to a PAS polymerization reaction temperature with a temperature of from room temperature to 250° C. being particularly preferable. If the treatment temperature is lower than the aforesaid lower limit, the present effects cannot be sufficiently attained. A period of time for the acid treatment depends on the treatment temperature and properties of PAS to be treated. It is preferably 5 minutes to 24 hours, particularly 20 minutes to 3 hours. If the treatment time is shorter than the aforesaid lower limit, the present effects cannot be sufficiently attained, again. A pressure is not particularly restricted and the treatment is carried out preferably by pressure feeding the acid or hydrogen salt to a reactor after the end of the reaction.

In the present invention, water may be added to the PAS slurry prior to or simultaneously with the addition of the acid or hydrogen salt for the purpose of enhancing dissociation of the acid. The amount of water to be added is preferably at most 200 mole %, particularly at most 100 mole %, and preferably at least 1.0 mole %, particularly at least 10 mole %, per mole of the alkali metal sulfide supplied. Water may be added, if desired, as a mixture with an organic amide solvent used in the PAS polymerization, such as N-methyl pyrrolidone.

In the present invention, it is preferred that the PAS slurry obtained after the treatment with the aforesaid acid or hydrogen salt is filtered and the solvent-containing filter cake obtained is then heated in an atmosphere of non-oxidizing gas to remove the solvent.

For example, the PAS slurry treated as mentioned above is filtered to obtain a PAS cake containing a solvent. The PAS cake is then heated under a flow of non-oxidizing gas such as helium, argon, hydrogen and nitrogen, preferably a flow of nitrogen gas, preferably at a temperature of 150 to 250° C., particularly 180 to 230° C., preferably for 10 minutes to 24 hours, particularly 1 to 10 hours. The heating is carried out preferably at a pressure of from 200 mmHg to 3 atm, more preferably from 400 mmHg to 3 atm, particularly normal pressure. The aforesaid removal of a solvent by heating may simplify processes of water washing, etc. and improve the recovery of solvent remarkably, compared to the prior process of removing a solvent by water washing and, therefore, exhibits higher productivity and is advantageous in cost.

The PAS from which the solvent is thus removed is then subjected preferably to water washing. The water washing is preferably carried out by dispersing the thus-heated filter cake in water. For example, the PAS cake obtained after the heating as mentioned above is put into, preferably, one to five times weight of water and stirred preferably at a temperature of from room temperature to 90° C., preferably for 5 minutes to 10 hours, and then filtered. These stirring and filtration are repeated preferably two to ten times to remove the solvent and by-product salts adhering to the PAS and thus complete the water washing. This manner of water washing realizes more efficient washing with a less amount of water, compared to a washing manner where water is poured to a filter cake. Alternatively, pressurized water washing may be conducted where heating is carried out above the boiling point of water in a closed system to make the removal of by-product salts easier.

The PAS prepared in the present process as mentioned above has a high crystallization speed and high whiteness and, in addition, high mechanical strength. Furthermore, it has a less content of impurities such as sodium. Accordingly, it may be properly used in injection molding.

The process (2) will be described below.

In the process (2) of the present invention, a zinc compound is added to the polyarylene sulfide slurry and, then, the slurry is acid treated with an acid or hydrogen salt. The amount of the zinc compound to be added to PAS after the polymerization reaction is at most 1.5 mole %, preferably at most 1.0 mole %, and at least 0.1 mole %, preferably at least 0.5 mole %, per mole of the alkali metal sulfide supplied. If the amount exceeds the aforesaid upper limit, rise of a crystallization temperature, Tc, by the subsequent addition of an acid or hydrogen salt is less. Meanwhile, if the amount is less than the aforesaid lower limit, it is impossible to raise whiteness of PAS. The zinc compound used in the invention is preferably one which is soluble in a PAS slurry after the reaction and includes zinc chloride, zinc acetate, zinc sulfate and zinc sulfide with zinc chloride being preferably used.

In the present process, the treatment of a PAS slurry with a zinc compound is preferably carried out as follows:

The zinc compound is added to the PAS prepared in a PAS polymerization process. The zinc compound is added preferably in a form of a solution in a small amount of water or in a mixture of water/the organic amide type solvent used in the PAS polymerization such as N-methyl pyrrolidone.

A temperature of the treatment with a zinc compound may be any temperature, preferably, in a range of from room temperature to a polymerization reaction temperature of PAS with a temperature of from room temperature to 220° C. being particularly preferable. If the treatment temperature is lower than the aforesaid lower limit, the present effects cannot be sufficiently attained. A period of time for the treatment with a zinc compound depends on the treatment temperature and properties of PAS to be treated and is preferably 5 minutes to 24 hours, particularly 20 minutes to 3 hours. If the treatment time is shorter than the aforesaid lower limit, the present effects cannot be sufficiently attained, again. A pressure is not restricted and the treatment is carried out preferably by pressure feeding the zinc compound to a reactor after the end of the reaction.

In this process, an acid or hydrogen salt is then added to the PAS slurry after the aforesaid addition of a zinc compound.

The amount of the acid or hydrogen salt to be added is preferably at most 10 mole %, more preferably at most 6.0 mole %, and at least 0.2 mole %, preferably at least 0.5 mole %, per mole of the alkali metal sulfide supplied. If the amount of the acid or hydrogen salt is less than the aforesaid lower limit, a crystallization temperature cannot be increased and whiteness is lower.

The acid and the hydrogen salt mentioned above for the process (1) may be used here.

A manner of treating a PAS slurry with an acid or hydrogen salt may be carried out as mentioned above for the process (1)

An acid treatment temperature may be any temperature, preferably, in a range of from room temperature to a PAS polymerization reaction temperature with a range of from room temperature to 220° C. being particularly preferable. If the treatment temperature is lower than the aforesaid lower limit, the present effects cannot be sufficiently attained. A period of time for the acid treatment depends on the treatment temperature and properties of PAS to be treated. It is preferably 5 minutes to 24 hours, particularly 20 minutes to 3 hours. If the treatment time is shorter than the aforesaid lower limit, the present effects cannot be sufficiently attained. A pressure is not particularly restricted and the treatment is carried out preferably by pressure feeding the acid or hydrogen salt to a reactor after the end of the reaction.

In the present invention, water may be added to the PAS slurry prior to or simultaneously with the addition of the acid or hydrogen salt for the purpose of enhancing dissociation of the acid. The amount of water to be added is preferably at most 200 mole %, particularly at most 100 mole %, and preferably at least 1.0 mole %, particularly at least 10 mole %, per mole of the alkali metal sulfide supplied. Water may be added alone or as a mixture with the organic amide type solvent used in the PAS polymerization, such as N-methyl pyrrolidone.

In the present invention, it is preferred that the PAS slurry obtained after the treatment with the aforesaid zinc compound and with the aforesaid acid or hydrogen salt is filtered and the solvent-containing filter cake obtained is then heated in an atmosphere of non-oxidizing gas to remove the solvent.

For example, the PAS slurry treated as mentioned above is filtered to obtain a PAS cake containing a solvent. The PAS cake is then heated in a non-oxidizing atmosphere, for example, in a flow of non-oxidizing gas such as helium, argon, hydrogen and nitrogen, or under reduced pressure, preferably in a flow of nitrogen gas, preferably, at a temperature of 150 to 250° C., particularly 180 to 230° C., preferably for 10 minutes to 24 hours, particularly 1 to 10 hours. The heating is carried out preferably at a pressure of from normal pressure to 3 atm, particularly normal pressure. The aforesaid removal of a solvent by heating may simplify of, water washing, etc. and improve the recovery of a solvent remarkably, compared to the prior process of removing a solvent by water washing and, therefore, exhibits higher productivity and is advantageous in cost.

The PAS from which the solvent is thus removed is then subjected preferably to water washing. The water washing may be carried out in the same manner as in the present process (1).

The PAS prepared in the present process as mentioned immediately above has a high crystallization speed and high whiteness and, in addition, high mechanical strength. Accordingly, it may be properly used in injection molding.

In the present invention, a manner for the polymerization of an alkali metal sulfide with a dihaloaromatic compound in an organic amide solvent is not particularly restricted and includes, for example, a process for the preparation of PAS by reacting an alkali metal sulfide with a dihaloaromatic compound in an organic amide solvent, as described in Japanese Patent Publication No. Sho-45-3368/1970; a process where an alkali metal carboxylate is used, as described in Japanese Patent Publication No. Sho-52-12240/1977; a process where a polymerization aid such as lithium halide is used, as described in US Patent No. 4,038,263; a process where a cross-linking agent such as a polyhaloaromatic compound is used, as described in Japanese Patent Publication No. Sho-54-8719/1979; and a process where the reaction is conducted in multi-steps reaction in the presence of different amounts of water, as described in Japanese Patent Publication No. Sho-63-33775/1988.

Preferably, use may be made of a process for the preparation of PAS by reacting an alkali metal sulfide with a dihaloaromatic compound in an organic amide type solvent wherein a part of a gaseous phase in a reactor is condensed by cooling a gaseous phase part of the reactor to return the condensed liquid to a liquid phase, as described in Japanese Patent Application Laid-Open No. Hei-5-222196/1993 and U.S. Patent No. 5,342,920. With the use of this process, PAS with relatively high melt viscosity, $V_6$, may be prepared. Accordingly, PAS with high mechanical strength such as tensile strength and impact strength may be obtained.

In the aforesaid process, the liquid to be refluxed has a higher water content compared to the liquid phase bulk, because of difference in vapor pressure between water and the amide type solvent. This reflux liquid with a higher water content creates a layer having a higher water content in the upper part of the reaction solution. As a result, larger amounts of the remaining alkali metal sulfide (e.g., $Na_2S$), alkali metal halide (e.g., NaCl) and oligomers are contained in this layer. In conventional processes, formed PAS, starting materials such as $Na_2S$ and by-products are mixed together homogeneously at a high temperature of 230° C. or higher. In such conditions, high molecular weight PAS is not formed and, moreover, even once-formed PAS may be depolymerized to form thiophenol as by-products. It is believed that the aforesaid unfavorable phenomena may be avoided, factors which interfere with reaction may be excluded very effectively and high molecular weight PAS may be obtained by actively cooling the gaseous phase part of a reactor and returning a large amount of a water-rich reflux liquid to the upper part of the liquid phase. However, this process should not be restricted by the effects attained only by the aforesaid phenomena, but various effects caused by cooling the gaseous phase part may give high molecular weight PAS.

Addition of water in the middle course of the reaction is unnecessary in this process, unlike in conventional processes, but such addition of water is not precluded. However, some of the advantages of this process will be lost with operations of adding water. Accordingly, it is preferred that the whole water content in a polymerization system is constant in the course of the reaction.

A means of cooling the gaseous phase part of a reactor may be any cooling means known per se, such as external cooling or internal cooling, and preferably comprises an internal coil in which a coolant flows, mounted in an upper internal part of the reactor, an external coil in which a coolant flows, coiled on an upper outer wall of the reactor, a jacket in which a coolant flows, mounted on an upper outer wall of the reactor, a reflux condenser mounted above the reactor or a unit for spraying or blowing water or gas (e.g., air or nitrogen gas) directly to an upper outer wall of the reactor. Any other means may also be applied as long as they have an effect of increasing the amount of a reflux in the reactor. When a surrounding temperature is comparatively low (e.g. normal temperature), proper cooling may be done by removing heat insulating materials from the upper part of a conventional reactor. In the case of the external cooling, a water/amide solvent mixture condensed on the wall of a reactor may fall down along the wall to reach the upper layer of the liquid phase in a reactor. Then, such a water-rich mixture remains in the upper part of the liquid phase and maintains the water content there relatively higher. In the case of the internal cooling, a mixture condensed on the cooling surface may fall down along the surface of a cooling unit or the wall of a reactor and reaches the liquid phase in a reactor, likewise.

Meanwhile, the temperature of a liquid phase bulk is maintained constant at a predetermined value, or controlled in accordance with a predetermined temperature profile. In the case where the temperature is constant, reaction is preferably carried out at a temperature of 230 to 275° C. for 0.1 to 20 hours, more preferably 240 to 265° C. for 1 to 6 hours. It is advantageous to apply a reaction temperature profile having at least two steps in order to obtain higher molecular weight PAS. The first step in the two steps operations is preferably conducted at a temperature of 195 to 240 C. If the temperature is lower, a reaction rate is too late to be practical. If it exceeds 240° C., a reaction rate is too fast to obtain sufficiently high molecular weight PAS and, moreover, rates of side reactions increase noticeably. The first step is preferably ended at a time when a ratio of the remaining dihaloaromatic compound to the charged one in the polymerization system is 1 to 40 mole % and the molecular weight reaches a range of from 3,000 to 20,000. The ratio of 2 to 15 mole % and a molecular weight range of from 5,000 to 15,000 are more preferred. If the ratio exceeds 40 mole %, side reactions such as depolymerization tend to occur in a subsequent second step. If it is less than 1 mole %, it is difficult to obtain high molecular weight PAS finally. Then, the temperature is increased and in a final step, the reaction is preferably carried out at a reaction temperature of 240 to 270° C. for 1 to 10 hours. If the temperature is lower, sufficiently high molecular weight PAS cannot be obtained. If the temperature exceeds 270° C., side reactions such as depolymerization tend to occur and it is difficult to stably prepare high molecular weight product.

In practice, a water content in a polymerization system is brought to a predetermined value by dehydration or addition of water at need in an atmosphere of inert gas. The water content is preferably 0.5 to 2.5 moles, more preferably 0.8 to 1.2 moles, per mole of the alkali metal sulfide. If it exceeds 2.5 moles, a reaction rate is low and by-products such as phenols increase in a filtrate after the completion of the reaction and, further, a polymerization degree is low. If it is less than 0.5 mole, the reaction rate is too fast to obtain sufficiently high molecular weight one, and unfavorable reactions such as side reactions may occur.

In the case of the one step reaction at a constant temperature, the cooling of the gaseous phase part during the reaction should be started, at latest, below 250° C. in the middle course of temperature rise, but preferably started at the beginning of the reaction. In the case of the multi steps reaction, the cooling is preferably started, at latest, in the middle course of temperature rise after a first step reaction, but more desirably started in a first step reaction. Pressure in a reactor is usually a most proper measure for a degree of a cooling effect. An absolute value of pressure depends upon characteristics of a reactor, stirring conditions, a water content in a reaction system, a mole ratio of a dihaloaromatic compound to an alkali metal sulfide and so on. However, a decreased reactor pressure, compared to that in the same reaction conditions except the absence of the cooling, means that the amount of a reflux is increased and the temperature at the gas-liquid interface of a reaction solution is lowered. It is thought that a relative decrease in pressure indicates an extent of separation between a layer with a larger water content and the remaining layer. Accordingly, the cooling is preferably done to such an extent that an internal pressure in a reactor is lower than that of the case where the cooling is not conducted. A person skilled in the art may determine the extent of the cooling, depending upon equipment 3 used and operation conditions.

Organic amide solvents to be used in the aforesaid process are those known for the polymerization of PAS and include, for instance, N-methyl pyrrolidone (hereinafter, NMP), N, N-dimethyl formamide, N, N-dimethyl (or diethyl) acetamide, N-methyl (or ethyl) caprolactam, 1,3-dimethyl-2-imidazolidinone, formamide, acetamide, hexamethylphosphoramide, tetramethylurea, N,N'-ethylene-2-pyrrolidone, 2-pyrrolidone, -caprolactam, diphenylsulfone and mixtures thereof with NMP being preferred. All of these have vapor pressure lower than that of water.

Alkali metal sulfides are also known and include, for instance, lithium sulfide, sodium sulfide, potassium sulfide, rubidium sulfide, cesium sulfide and mixtures thereof. These may be hydrated or in a form of an aqueous solution. Alternatively, hydrosulfides or hydrates corresponding to these may be neutralized with each corresponding hydroxide into the corresponding sulfides and used. Sodium sulfide which is less expensive is preferred.

Dihaloaramatic compounds may be selected from ones described in Japanese Patent Publication Sho-45-3368/1970. p-Dichlorobenzene is preferred. Further, a small amount (20 mole % or less) of one or more of p-, m-, or o-dihalogenated ones of diphenyl ether, diphenyl sulfone or biphenyl may be used to prepare copolymers, such as m-dichlorobenzene, o-dichlorobenzene, p,p'-dichlorodiphenyl ether, m,p'-dichlorodiphenyl ether, m,m'-dichlorodiphenyl ether, p,p'-dichlorodiphenyl sulfone, m,p'-dichlorodiphenyl sulfone, m,m'-dichlorodiphenyl sulfone, p,p'-dichlorobiphenyl, m,p'-dichlorobiphenyl and m,m'-dichlorobiphenyl.

Polyhalogenated compound, such as 1,3,5-trichlorobenzene and 1,2,4-trichlorobenzene, may also be used preferably in an amount of 0.005 to 1.5 mole %, particularly 0.02 to 0.75 mole % per mole of the alkali metal sulfide, in order to raise the molecular weight of PAS.

The PAS prepared in the present processes (1) and (2) may be mixed with conventional additives such as powdery fillers, for example, carbon black, calcium carbonate, silica and titanium oxide; or fibrous fillers, for example, carbon fibers, glass fibers, asbestos fibers and polyaramide fibers in a molding process.

In addition, other additives such as antioxidants, heat stabilizers, lubricants, mold releasing agents, silane coupling agents and colorants may be blended, if needed.

The invention will further be explained in reference to the following Examples, but the invention shall not be restricted by these Examples.

EXAMPLE

In these Examples, properties of PPS were determined as follows.

Crystallization temperature, Tc:

Crystallization temperature, Tc, was determined by differential scanning calorimetry (DSC). Differential calorimeter SSC/5200, ex Seiko Denshi Company Ltd. was used. The determination was carried out as follows: After 10 mg of a sample were heated in a flow of nitrogen from room temperature to 320° C. at a rate of 20° C./min., they were maintained at 320° C. for 5 minutes to be molten. Subsequently, they were cooled at a rate of 10° C./min. and an exothermic peak temperature was measured, which was crystallization temperature, Tc.

Melt viscosity, $V_6$:

Viscosity in poise was measured after a sample was held for 6 minutes in conditions of a temperature of 300° C., a load of 20 kgf/cm$^2$ and L/D=10/1 using flow tester CFT-500 C, ex Shimazu Seisakusho Company Ltd.

Hue:

Whiteness (hot press L value) of the polymer obtained was determined as follows: the polymer was preheated at 320° C. for 1.5 minutes and subsequently subjected to pressure molding at 320° C. for 1.5 minutes and then 130° C. for 1.5 minutes at 30 kg/cm$^2$ to form a disc plate. An L value on this plate was determined with a color-difference meter, Color Ace, ex Tokyo Denshoku Company Ltd.

Sodium content:

After PPS powder was burnt in a muffle furnace at 700° C., the residue was dissolved in hydrochloric acid, which was then analyzed with atomic absorption analyzer AA-670, ex Shimazu Seisakusho Company Ltd. Filterability (filtration rate) A hundred grams of a PAS slurry after the reaction were subjected to vacuum filtration (filter paper Kiriyama S95 type, No. 704 x 95 m/m, ex Nippon Rikagaku Kiki Company Ltd.) at a degree of vacuum of 500 mmHg at 50° C. A time period needed for the filtration and the amount of a filtrate were determined. The filterability was obtained according to the following formula:

filterability (g/sec.)=amount of the filtrate (g)/time period needed for the filtration (sec.)

Example 1

In a 150 liters autoclave were charged 15.400 kg of flaky sodium sulfide (Na$_2$S content of 60.81% by weight) and 38.0 kg of N-methyl-2-pyrrolidone (hereinafter referred to as NMP). The temperature was elevated to 216° C. in a flow of nitrogen with stirring to distill off 3.843 kg of water. The autoclave was then sealed and cooled to 180° C., in which 17.640 kg of para-dichlorobenzene (hereinafter referred to as p-DCB) and 16.0 kg of NMP were charged. After pressurizing it to 1 kg/cm$^2$G (i.e., gauge pressure) with nitrogen gas at a liquid temperature of 150° C., the temperature started to be raised. The temperature was elevated to 260° C. over four hours. When the liquid temperature reached 260° C., it was started to spray water over the upper part of the autoclave. This liquid temperature was maintained for 2 hours to carry out a reaction. After the end of the reaction, the content was cooled. When the liquid temperature reached 150° C., 0.432 kg of acetic acid (6.0 mole % per mole of sodium sulfide) was fed to the autoclave under pressure by a pressure injection pump. The content was stirred at 150° C. for 30 minutes to be acid treated and then cooled. A pH of the slurry during the treatment was 9.4.

The slurry obtained was filtered to remove the solvent. Next, the filter cake containing the solvent was heated at 220° C. for about 6 hours in a flow of nitrogen to remove the solvent. The PPS powder obtained was washed with water and filtered seven times in a conventional manner. After dried at 120° C. for about eight hours in a hot air ventilation dryer, a white powdery polymer (P-1) was obtained.

Example 2

The procedures in Example 1 were repeated, except that a solution of 0.151 kg of oxalic acid dihydrate (1.0. mole % per mole of sodium sulfide) in 0.856 kg of NMP was used in place of acetic acid. A white powdery polymer (P-2) was obtained.

Example 3

The procedures in Example 1 were repeated, except that a solution of 0.331 kg of formic acid (6.0 mole % per mole of sodium sulfide) in 0.331 kg of NMP was used in place of acetic acid. A white powdery polymer (P-3) was obtained.

Example 4

The procedures in Example 1 were repeated, except that a solution of 0.113 kg of monochloroacetic acid (1.0 mole % per mole of sodium sulfide) in 0.113 kg of NMP was used in place of acetic acid. A white powdery polymer (P-4) was obtained.

Example 5

The procedures in Example 1 were repeated, except that 0.125 kg of 35% hydrochloric acid (1.0 mole % per mole of sodium sulfide) was used in place of acetic acid. A white powdery polymer (P-5) was obtained.

Example 6

The procedures in Example 1 were repeated, except that a solution of 0.166 kg of sodium hydrogen sulfate monohydrate (1.0 mole % per mole of sodium sulfide) in 0.166 kg of water was used in place of acetic acid. A white powdery polymer (P-6) was obtained.

Example 7

The procedures in Example 1 were repeated, except that a solution of 0.091 kg of oxalic acid dihydrate (0.6 mole % per mole of sodium sulfide) in 0.516 kg of NMP was used in place of acetic acid. A white powdery polymer (P-7) was obtained.

Comparison Example 1

The procedures in Example 1 were repeated, except that acetic acid was not added. A white powdery polymer (PC-1) was obtained.

Comparison Example 2

The procedures in Example 1 were repeated, except that a solution of 0.015 kg of oxalic acid dihydrate (0.1 mole % per mole of sodium sulfide) in 0.085 kg of NMP was used in place of acetic acid. A white powdery polymer (PC-2) was obtained.

Comparison Example 3

The procedures in Example 1 were repeated, except that a solution of 1.815 kg of oxalic acid dihydrate (12.0 mole % per mole of sodium sulfide) in 10.285 kg of NMP was used in place of acetic acid. A white powdery polymer (PC-3) was obtained.

Comparison Example 4

This corresponds to the method of the aforesaid Japanese Patent Publication No. Hei-6-68025/1994.

The procedures in Example 1 were repeated, except that 0.150 kg of 35% hydrochloric acid (1.2 mole % per mole of sodium sulfide) was used in place of acetic acid. A white powdery polymer (PC-4) was obtained.

Comparison Example 5

This corresponds to the method of the aforesaid Japanese Patent Application Laid-Open No. Sho-62-48728/1987.

The polymerization reaction was carried out as in Example 1. After the end of the reaction, the PPS slurry was cooled without the addition of acetic acid. The reaction slurry obtained was filtered to remove the solvent. Next, the PPS powder obtained was washed with water and filtered four times in a conventional manner. To a dispersion of the PPS in water/acetone (9/1, volume/volume) was added 35% hydrochloric acid to adjust the pH to 1.5. The acid treatment was continued for 30 minutes, followed by filtration. Further, water washing and filtration treatment was repeated three times. After dried at 120° C. for about eight hours in a hot air ventilation dryer, a white powdery polymer (PC-5) was obtained.

Comparison Example 6

The procedures in Comparison Example 5 were repeated, except that the filter cake from the reaction slurry was first heated at 220° C. for about 6 hours in a flow of nitrogen as in a preferred embodiment of the present invention. A white powdery polymer (PC-6) was obtained.

Properties were determined on the PASs' obtained in Examples 1 to 7 and Comparison Examples 1 to 6.

The results are as shown in Table 1.

TABLE 1

| | Example | | | | | | | Comparison Example | | | | | |
|---|---|---|---|---|---|---|---|---|---|---|---|---|---|
| | 1 | 2 | 3 | 4 | 5 | 6 | 7 | 1 | 2 | 3 | 4 | 5 | 6 |
| Treatment conditions | | | | | | | | | | | | | |
| pH of slurry | 9.4 | 8.9 | 7.7 | 8.0 | 7.7 | 7.8 | 9.6 | 11.9 | 11.5 | 3.9 | 5.8 | 11.9* | 11.9* |
| Type of acid | <1> | <2> | <3> | <4> | <5> | <6> | <2> | — | <2> | <2> | <5> | — | — |
| Amount of acid, mole % | 6.0 | 1.0 | 6.0 | 1.0 | 1.0 | 1.0 | 0.6 | — | 0.1 | 120 | 1.2 | — | — |
| Filterability, g/sec. | 0.75 | 0.81 | 1.21 | 0.98 | 1.19 | 1.20 | 0.74 | 0.45 | 0.53 | 1.51 | 1.29 | 0.45 | 0.45 |

TABLE 1-continued

|  | Example | | | | | | | Comparison Example | | | | | |
| --- | --- | --- | --- | --- | --- | --- | --- | --- | --- | --- | --- | --- | --- |
|  | 1 | 2 | 3 | 4 | 5 | 6 | 7 | 1 | 2 | 3 | 4 | 5 | 6 |
| Properties of PPS | | | | | | | | | | | | | |
| Tc, ° C. | 238 | 237 | 241 | 240 | 243 | 238 | 235 | 218 | 222 | 252 | 248 | 252 | 219 |
| Melt viscosity $V_6$, poise | 240 | 230 | 230 | 230 | 210 | 200 | 230 | 240 | 240 | 150 | 170 | 190 | 240 |
| Whiteness(HP/L) | 58 | 60 | 59 | 59 | 61 | 62 | 58 | 51 | 52 | 54 | 55 | 62 | 50 |
| $Na_2O$, ppm | 250 | 220 | 160 | 210 | 190 | 180 | 380 | 1100 | 800 | 50 | 120 | 100 | 1000 |

<1> acetic acid, <2> oxalic acid, <3> formic acid, <4> MCAA (monochloroacetic acid), <5> hydrochloric acid, <6> SHS (sodium hydrogen sulfate)
*later, treated at pH 1.5 in a water/acetone mixture.

In Examples 1 to 5, a PPS slurry was treated with various acids in the pH range of the present invention. Each PPS exhibits good crystallization temperature, Tc, melt viscosity, $V_6$, whiteness and sodium content. In Example 6, sodium hydrogen sulfate was used as a hydrogen salt. The PPS also exhibits good properties. In Example 7, the amount of oxalic acid added was smaller than that in Example 2 and a pH of the PPS slurry was raised in the range of the present invention. The crystallization temperature, Tc, and melt viscosity, $V_6$ were almost same as those in Example 2. Although the whiteness decreased somewhat and the sodium content increased somewhat, the present effects were not lost.

In Comparison Example 1, no acid treatment was carried out while the other conditions were same as in Example 1. Tc was considerably lower. In addition, the whiteness was lower and the sodium content was remarkably higher. In Comparison Example 2, the amount of oxalic acid added was smaller and a pH of the PAS slurry exceeded the range of the present invention. Tc was remarkably low compared to that in Example 2. In addition, the whiteness was lower and the sodium content was remarkably higher. In Comparison Example 3, the amount of oxalic acid added was larger and the pH value was below the range of the present invention. $V_6$ was remarkably lower and, therefore, it is seen that PPS suffered considerable decrease in molecular weight. In Comparison Example 4, acid treatment on a PPS slurry was carried out according to the process described in Japanese Patent Publication No. Hei-6-68025/1994. That is, a pH of the slurry was 5.8 which was below the range of the present invention. $V_6$ was considerably low and, therefore, it is seen that PPS suffered considerable decrease in molecular weight. In Comparison Examples 5, acid treatment on a PPS slurry was carried out according to the process described in Japanese Patent Application Laid-Open No. Sho-62-48728/1987. The PPS slurry was separated from the reaction mixture, and then acid treated below the pH range of the present invention. Although the Tc was high and the whiteness was high, the process had disadvantages that the melt viscosity, $V_6$, was low ;and the productivity was low because of the low filterability of the reaction slurry. In Comparison Examples 6, a PPS slurry was separated from the reaction mixture, heated to remove a solvent, and then acid treated below the pH range of the present invention. The filterability of the reaction slurry was low. Tc was considerably low. In addition, the whiteness was low and the sodium content was considerably high.

Example 8

In a 150 liters autoclave were charged 15.400 kg of flaky sodium sulfide ($Na_2S$ content of 60.81% by weight) and 38.0 kg of N-methyl-2-pyrrolidone. The temperature was elevated to 216° C. in a flow of nitrogen with stirring to distill off 3.843 kg of water. The autoclave was then sealed and cooled to 180° C., in which 17.640 kg of para-dichlorobenzene and 16.0 kg of NMP were charged. After pressurizing it to 1 kg/cm$^2$G with nitrogen gas at a liquid temperature of 150° C., the temperature started to be raised. The temperature was elevated to 260° C. over four hours. When the liquid temperature reached 260 C., it was started to spray water over the upper part of the autoclave. This liquid temperature was maintained for 2 hours to carry out a reaction. After the end of the reaction, the content was cooled. When the liquid temperature reached 170° C., a solution of 0.163 kg of zinc chloride (1.0 mole % per mole of sodium sulfide) in 0.163 kg of water was fed to the autoclave under pressure by a pressure injection pump. It was stirred at 170° C. for 30 minutes. Subsequently, at that temperature, a solution of 0.151 kg (1.0 mole % per mole of sodium sulfide) of oxalic acid dihydrate in 0.856 kg of NMP was fed to the autoclave under pressure by a pressure injection pump. The content was stirred at 170° C. for 30 minutes to be acid treated and then cooled.

The slurry obtained was filtered to remove the solvent. Next, the filter cake containing the solvent was heated at 220° C. for about 6 hours in a flow of nitrogen to remove the solvent. The PPS powder obtained was washed with water and filtered seven times in a conventional manner. After dried at 120° C. for about eight hours in a hot air ventilation dryer, a white powdery polymer (P-8) was obtained.

Example 9

The procedures in Example 8 were repeated, except that a solution of 0.091 kg of oxalic acid dihydrate (0.6 mole % per mole of sodium sulfide) in 0.516 kg of NMP was used. A white powdery polymer (P-9) was obtained.

Example 10

The procedures in Example 8 were repeated, except that a solution of 0.227 kg of oxalic acid dihydrate (1.5 mole % per mole of sodium sulfide) in 1.236 kg of NMP was used. A white powdery polymer (P-10) was obtained.

Example 11

The procedures in Example 8 were repeated, except that a solution of 0.082 kg of zinc chloride (0.5 mole % per mole of sodium sulfide) in 0.082 kg of water was used. A white powdery polymer (P-11) was obtained.

Example 12

The procedures in Example 11 were repeated, except that a solution of 0.454 kg of oxalic acid dihydrate (3.0 mole % per mole of sodium sulfide) in 6.667 kg of NMP was used. A white powdery polymer (P-12) was obtained.

Example 13

The procedures in Example 8 were repeated, except that 0.432 kg of acetic acid (6.0 mole % per mole of sodium sulfide) was used in place of oxalic acid dihydrate and a solvent-containing filter cake was heated at 190° C. for about 7 hours under a pressure of 50 torr to remove the solvent. A white powdery polymer (P-13) was obtained.

Example 14

The procedures in Example 8 were repeated, except that the stirring treatments with zinc chloride and with oxalic acid dihydrate were carried out at 30° C. A white powdery polymer (P-14) was obtained.

Comparison Example 7

The procedures in Example 8 were repeated, except that zinc chloride and oxalic acid dihydrate were not added. A white powdery polymer (PC-7) was obtained.

Comparison Example 8

The procedures in Example 8 were repeated, except that oxalic acid dihydrate was not added. A white powdery polymer (PC-8) was obtained.

Comparison Example 9

This is equal to Example 2.

The procedures in Example 8 were repeated, except that zinc chloride was not added. A white powdery polymer (PC-9) was obtained. Comparison Example 10 The procedures in Example 8 were repeated, except that a solution of 0.327 kg of zinc chloride (2.0 mole %per mole of sodium sulfide) in 0.327 kg of water was used. A white powdery polymer (PC-10) was obtained.

The properties were determined on the PPSs' obtained in Examples 8 to 14 and Comparison Examples 7 to 10.

The results are as shown in Table 2.

other conditions were same as in Example 11. Tc increased considerably. In Example 13, acetic acid was used. All of the properties of PPS were good. In Example 14, the treatments with zinc chloride and with oxalic acid were carried out at 30° C. while the other conditions were same as in Example 8. The properties of the PPS were almost same as those in Example 8.

Meanwhile, in Comparison Example 7, no treatment with zinc chloride or with oxalic acid was carried out. Tc and the whiteness were considerably low compared to those in Example 8. In Comparison Example 8, the treatment with oxalic acid was not carried out while the other conditions were same as in Example 8. The whiteness was good, but Tc was considerably lower. In Comparison Example 9, the treatment with zinc chloride was not carried out while the other conditions were same as in Example 8. Both Tc and the whiteness were lower than those in Example 8. In Comparison Example 10, zinc chloride was added in an amount above the present range while the other conditions were same as in Example 8. Tc was considerably lower.

We claim:

1. A process for the preparation of polyarylene sulfide comprising
    reacting an alkali metal sulfide with a dihaloaromatic compound in an organic amide solvent to obtain a polyarylene sulfide slurry, and
    thereafter subjecting the slurry to acid treatment prior to separation of polyarylene sulfide from said slurry wherein at least one selected from the group consisting of an acid and a hydrogen salt is added to the slurry in such an amount that a pH of the slurry is more than 7.0 and at most 11.0 after the acid treatment.

2. The process for the preparation of polyarylene sulfide claimed in claim 1, wherein the pH of the polyarylene sulfide slurry after the addition of the acid or hydrogen salt is 7.5 to 10.0.

3. The process for the preparation of polyarylene sulfide claimed in claim 1, wherein the at least one selected from the group consisting of acid and hydrogen salt is added in an amount of 0.2 to 10 mole % per mole of the alkali metal sulfide.

TABLE 2

|  | Example | | | | | | | Comparison Example | | | |
| --- | --- | --- | --- | --- | --- | --- | --- | --- | --- | --- | --- |
|  | 8 | 9 | 10 | 11 | 12 | 13 | 14 | 7 | 8 | 9 | 10 |
| Treatment conditions | | | | | | | | | | | |
| Amount of ZnCl$_2$, mole % | 1.0 | 1.0 | 1.0 | 0.5 | 0.5 | 1.0 | 1.0 | — | 1.0 | — | 2.0 |
| Type of acid | <1> | <1> | <1> | <1> | <> | <2> | <1> | — | — | <1> | <1> |
| Amount of acid, mole % | 1.0 | 0.6 | 1.5 | 1.0 | 3.0 | 6.0 | 1.0 | — | — | 1.0 | 1.0 |
| Properties of PPS | | | | | | | | | | | |
| Tc, ° C. | 242 | 236 | 248 | 245 | 252 | 238 | 241 | 218 | 222 | 237 | 228 |
| Whiteness (HP/L) | 65 | 66 | 61 | 62 | 63 | 64 | 66 | 51 | 67 | 60 | 67 |
| Melt viscosity V$_6$, poise | 230 | 240 | 230 | 220 | 210 | 250 | 230 | 240 | 250 | 230 | 270 |
| Na$_2$0, ppm | 210 | 400 | 160 | 200 | 120 | 380 | 220 | 1100 | 520 | 220 | 210 |

<1> oxalic acid, <2> acetic acid

In Examples 8 to 10, the amount of acid added was varied while the other conditions were constant. The larger the amount of acid, the higher the crystallization temperature, Tc. Although whiteness tended to lower somewhat, the present effects were not lost. In Example 11, the amount of zinc chloride added was smaller than that in Example 8, but was still in the range of the present invention. Although the whiteness lowered somewhat, the present effects were sufficiently attained. In Example 12, the amount of acid added was increased in the range of the present invention while the 4. The process for the preparation of polyarylene sulfide claimed in claim 1, wherein the at least one selected from the group consisting of acid and hydrogen salt is added in an amount of 0.5 to 6.0 mole % per mole of the alkali metal sulfide.

5. The process for preparation of polyarylene sulfide claimed in claim 1 further comprising filtering the polyarylene sulfide slurry after the acid treatment to obtain a solvent containing filter cake, and heating the filter cake in a non-oxidizing atmosphere.

6. The process for preparation of polyarylene sulfide claimed in claim 1 further comprising filtering the polyarylene sulfide slurry after the acid treatment to obtain a solvent-containing filter cake, and heating the filter cake at a temperature of 150 to 250° C. in a non-oxidizing atmosphere to remove solvent.

7. The process for preparation of polyarylene sulfide claimed in claim 1 further comprising filtering the polyarylene sulfide slurry after the acid treatment to obtain a solvent-containing filter cake, and heating the filter cake at a temperature of 180 to 250° C. in a non-oxidizing atmosphere to remove solvent.

8. The process for the preparation of polyarylene sulfide claimed in claim 1 further comprising filtering the polyarylene sulfide slurry after the acid treatment and obtaining a solvent-containing filter cake, heating the filter cake in a non-oxidizing atmosphere to remove solvent, and dispersing the filter cake in water.

9. The process for the preparation of polyarylene sulfide claimed in claim 1 comprising reacting the alkali metal sulfide with a dihaloaromatic compound while cooling a gaseous phase part of a reactor to condense a part of a gaseous phase in the reactor, and returning a condensed liquid to a liquid phase.

10. A process for the preparation of polyarylene sulfide comprising reacting an alkali metal sulfide with a dihaloaromatic compound in an organic amide solvent to obtain a polyarylene sulfide slurry, adding a zinc compound in an amount of 0.1 to 1.5 mole % per mole of an alkali metal sulfide to the polyarylene sulfide slurry, and thereafter adding to the slurry prior to separation of polyarylene sulfide from said slurry at least one selected from the group consisting of an acid and hydrogen salt in an amount of at least 0.2 mole % per mole of the alkali metal sulfide.

11. The process for the preparation of polyarylene sulfide claimed in claim 10 comprising adding the zinc compound in an amount of 0.5 to 1.0 mole % per mole of the alkali metal sulfide.

12. The process for the preparation of polyarylene sulfide claimed in claim 1 comprising adding the at least one selected from the group consisting of the acid and hydrogen salt in the amount of 0.2 to 10 mole % per mole of the alkali metal sulfide.

13. The process for the preparation of polyarylene sulfide claimed in claim 1 comprising adding the at least one selected from the group consisting of acid and hydrogen salt in an amount of 0.5 to 6.0 mole % per mole of the alkali metal sulfide.

14. The process for the preparation of polyarylene sulfide claimed in claim 10 further comprising filtering the polyarylene sulfide slurry after the acid treatment to obtain a solvent-containing filter cake, and heating the filter cake in a non-oxidizing atmosphere.

15. The process for the preparation of polyarylene sulfide claimed in claim 10 further comprising filtering the polyarylene sulfide slurry after the acid treatment to obtain a solvent-containing filter cake, and heating the filter cake at a temperature of 150 to 250° C. in a non-oxidizing atmosphere to remove solvent.

16. The process for the preparation of polyarylene sulfide claimed in claim 10 comprising filtering the polyarylene sulfide slurry after the acid treatment to obtain a solvent-containing filter cake, and heating the filter cake at a temperature of 180 to 250° C. in a non-oxidizing atmosphere to remove solvent.

17. The process for the preparation of polyarylene sulfide claimed in claim 10 further comprising filtering the polyarylene sulfide slurry after the acid treatment to obtain a solvent-containing filter cake, heating the filter cake in a non-oxidizing atmosphere to remove solvent, and dispersing the filter cake in water.

18. A process for the preparation of polyarylene sulfide in accordance sulfate and disodium hydrogen phosphate and the pH of the slurry is 7.5 to 10.0.

\* \* \* \* \*